Figure 1:
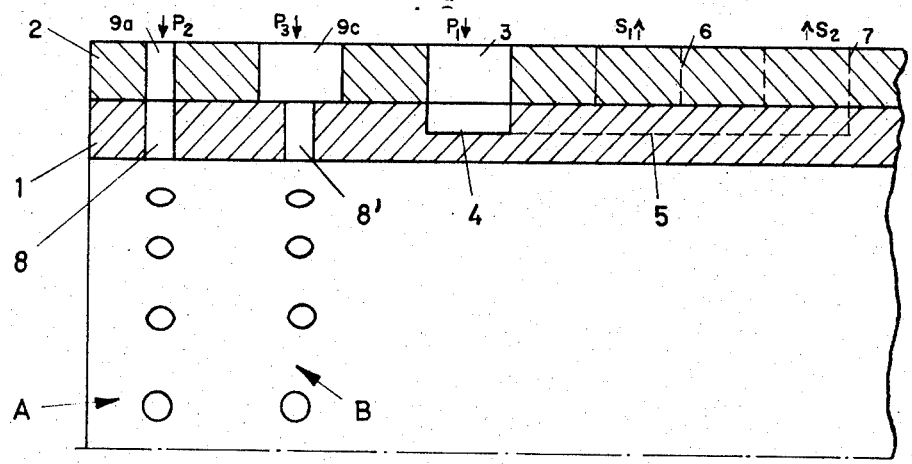

United States Patent [19]
Christensen

[11] 3,805,838
[45] Apr. 23, 1974

[54] CONTROL EQUIPMENT FOR HYDROSTATIC OR HYDRAULIC SYSTEMS (I)

[75] Inventor: Helge Kajholm Christensen, Nordborg, Denmark

[73] Assignee: Danfoss A/S, Nordborg, Denmark

[22] Filed: Nov. 6, 1972

[21] Appl. No.: 304,144

[30] Foreign Application Priority Data
Nov. 16, 1971 Germany.............................. 2156842

[52] U.S. Cl............................. 137/625.32, 251/209
[51] Int. Cl............................................. F16k 11/07
[58] Field of Search ...... 91/467; 137/625.3, 625.31, 137/625.32; 251/209, 345

[56] References Cited
UNITED STATES PATENTS
2,143,565  1/1939  Minea....................... 137/625.32 X
2,984,215  5/1961  Charson............................. 91/467
  304,443  9/1884  Morrison...................... 137/625.32
  944,026 12/1909  Fowden....................... 137/625.3 X
3,421,544  1/1969  Bozoyan.................... 137/625.31 X Primary Examiner—Henry T. Klinksiek

[57] ABSTRACT

The invention relates to a control valve assembly for a hydrostatic control system such as a power steering assembly. A common control valve assembly of this type has relatively rotatable inner and outer elements connected respectively to a vehicle steering wheel and a servomotor. Paired holes in the inner and outer elements permit the flow of fluid therethrough when the unit is in its neutral position with the paired holes in respective registration. In prior art units disturbing vibrations occur during the transition from the neutral position to a working position when the paired holes are moved out of registration. These vibrations are eliminated by making the holes in the outer element of varying size and larger than the corresponding holes in the inner element so that a gradual or progressive reduction of the porting area takes place instead of the paired holes closing simultaneously.

1 Claim, 6 Drawing Figures

CONTROL EQUIPMENT FOR HYDROSTATIC OR HYDRAULIC SYSTEMS (I)

The invention relates to control equipment for hydrostatic or hydraulic systems and in which two slide elements are relatively displaceable from a neutral position into two working positions, one on each side of the neutral position, each element having a plurality of holes and each of the holes in the first element pairing and registering with a hole in the second element in the neutral position, the paired holes forming a bypass between the delivery and discharge sides, which equipment is especially designed for steering systems in which a first rotary slide element is connected to a steering wheel and a secondary rotary slide element to a servo-motor which meters the pressurized fluid passed to a regulating element.

In a known piece of equipment of this kind, an inner rotary slide element is connected to the steering wheel and an outer rotary slide element is connected to a servo-motor. The two rotary slide parts are normally held in the neutral position by a spring. When the steering wheel is turned in one direction or another, a bypass between the supply and discharge sides is closed, and an operative connection is established, through other openings with the regulating means, e.g. an axial motor which displaces the wheels.

By means of the compressed fluid flowing through the servo-motor to or from the regulating element, the outer rotary slide element is caused to rotate in the direction in which the steering wheel is turned, until the neutral position is reached again. The outer rotary slide element is contained in a bore in a casing; these two parts act as a distributor valve for the servo-motor designed as a rotary piston engine. Each of the rotary slide elements has 36 neutral position holes which are arranged in two axially offset circles each comprising 18 holes. The diameters of these holes are small and are identical in both of the rotary slide elements (U.S. Patent No. Re. 25,126).

It has been found in practice that when changing from the neutral position to the working position or vice versa, disturbing vibrations occur in the operating equipment or in the pressurized fluid. The object of the present invention is to reduce such vibrations.

According to the invention, this object is achieved by providing at least three different sizes of hole.

In this arrangement, not all the uncovered cross sections of the paired holes are simultaneously closed when changing from the neutral to the working position. Instead a gradual change takes place during which, with increasing angle of rotation, the uncovered cross sections of some of the paired holes are first closed and then those of other paired holes are progressively closed. This results in a corresponding bypass quantity — angle of rotation curve which appears to be responsible for the reduction of the vibrations. By using at least three different sizes of hole and an appropriate number of holes of different size, it is possible to obtain an optimum curve as regards vibration.

In this system it is particularly advantageous if in the case of at least some of the paired holes, holes of greater cross section are each combined with a hole of smaller cross section. The uncovered cross-section, determined by the holes of smaller cross section is not reduced at all during the initial part of the rotary movement; this only occurs when the edge of the hole of greater cross-section overrides the hole of smaller cross section. In contrast to two holes of equal cross-section a smaller angle of rotation results in complete closure. Thus, relatively small angles of rotation suffice between the neutral position and the beginning of the working position.

An optimum curve is obtained if the holes of greatest cross section are present in smallest number, the holes of the next smallest cross section are present in the next greatest number and the holes of still smaller cross section are present in a still greater number. With increasing angle of rotation, the bypass quantity decreases suddenly in the first portion and very gradually in the last portion, and in between decreases in accordance with a transition curve.

In particular, holes of at least three different sizes can be provided in a single slide element. This results in a particularly favourable combination of holes and in reduced manufacturing costs especially when all the holes in the other slide element are of the same size, since the differing form of holes has only to be considered in the case of one of the slide elements.

It is particularly advantageous if, with the pairs of holes of differing size, the holes of greater cross-section are formed in that slide element facing the supply side. When compressed fluid flows through the neutral position holes noise often occurs especially when the uncovered cross section has already been reduced. This noise can be considerably decreased by means of the arrangement described.

In a preferred embodiment and in an arrangement of the paired holes along two axially offset circles on two rotary slide elements, first holes having the greatest and next smallest cross section are provided in the second circle, and holes having a still smaller cross section are provided in the first circle, and each second hole of a pair has a cross section which is at most only slightly greater than that of the first mentioned holes in the first circle.

A still better effect is achieved if the second holes in the second circle have a smaller cross section than the second holes in the first circle.

Figure 2:
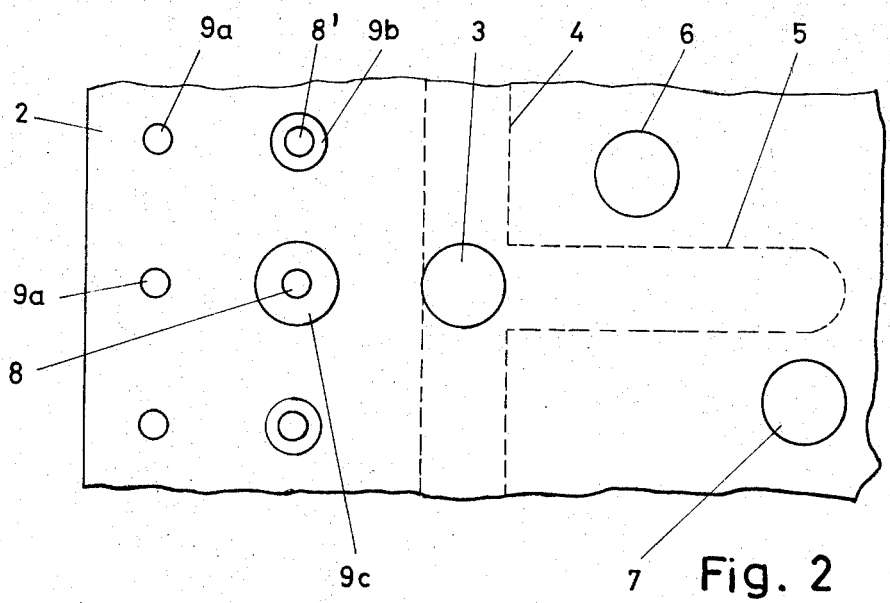
Figure 3:
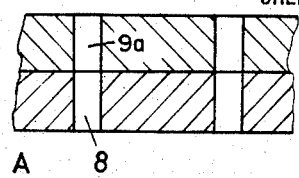
Figure 4:
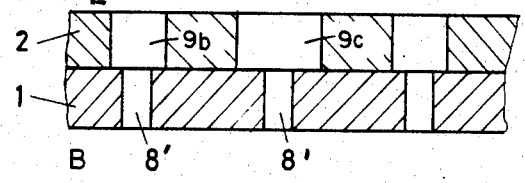
Figure 4:
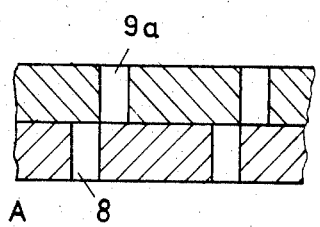
Figure 5:
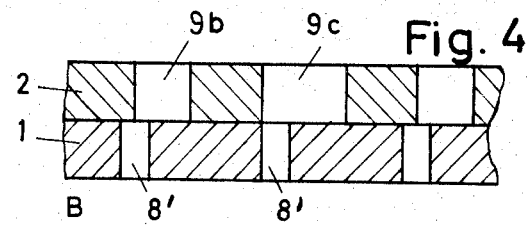
Figure 5:
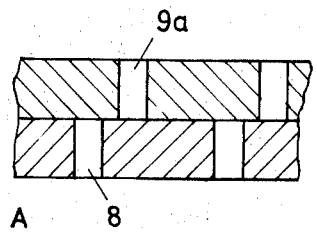
Figure 5:
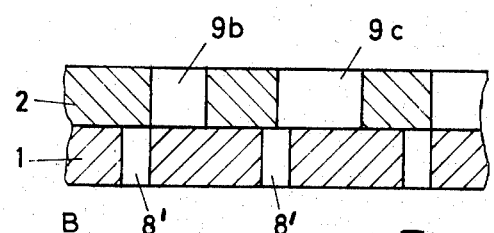
Figure 6:
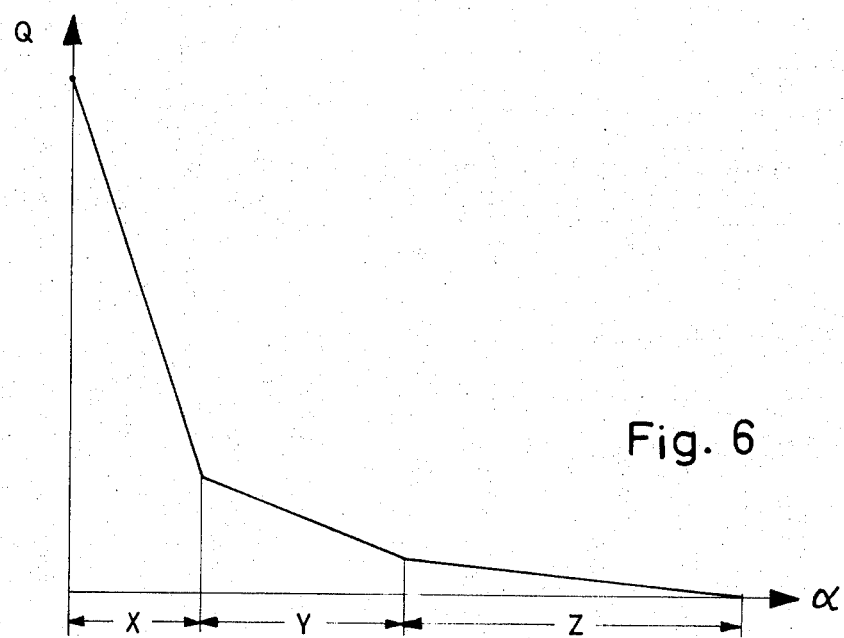

The invention will now be described in greater detail by reference to a form of construction illustrated in the drawing, in which:

FIG. 1 is a longitudinal section through part of the control equipment of the invention, FIG. 2 is a plane view of the outer periphery of the outer rotary slide, FIG. 3 is a partial developed cross section in the neutral position, FIG. 4 is a partial developed cross section after passing through a small angle of rotation, FIG. 5 is a partial developed cross section after passing through a somewhat greater angle of rotation, and FIG. 6 shows a bypass quantity — angle of rotation curve The control equipment comprises an inner rotary slide element 1 and an outer rotary slide element 2. The inner rotary slide element 1 may be connected to a steering wheel and the outer element 2 to a servo motor as described in U.S. Pat. No. Re. 25,126. The outer rotary slide element 2 can however be stationary and the inner rotary slide element 1 may be rotated by some other means.

Provided in the outer rotary slide element 2 are bores 3 through which the pressurized fluid is passed in the direction of the arrow $P_1$. The bores 3 communicate with a peripheral groove 4 in the inner rotary slide element 1, and axial grooves 5 extend from said peripheral groove. Rotation to the left enables an axial groove 5 to be connected with the bore 6 which passes the pressurized fluid in the direction of the arrow $S_1$ to a regulating element (not illustrated), which is displaced in one of its directions of movement. Rotation to the right brings the axial groove 5 into communication with a bore 7 through which the pressurized fluid is passed to the regulating member in the direction of the arrow $S_2$ so that this member is displaced in its other direction of movement. Expediently, similar grooves and bores are provided in the two slide elements for the purpose of controlling the return flow of the pressurized fluid.

Furthermore, the two rotary slide elements 1 and 2 have neutral position holes 8 and 9 respectively, which are associated with each other in pairs. These paired holed are arranged in two axially offset circles A and B. In circle B there are first holes 9c having the greatest cross section, and holes 9b having the next smallest cross section, and in circle A are first holes 9a having a still smaller cross-section. The second holes 8 in the first circle A have the same diameter or cross-section as the holes 9a; the second holes 8' in the second circle B have a somewhat smaller cross section, e.g. a diameter of 0.8 mm as against 1.0 mm.

In FIGS. 3 to 5, the holes comprising the circles A and B are shown in cross section and in developed form. In the neutral position all the holes 9a, 9b and 9c register with the holes 8 and 8'. If it is assumed that the holes 9 are connected externally to the supply side, whereas the cavity in the inner rotary side element 1 communicates with the discharge side, then pressurized fluid flows through the bypass formed by the paired holes 8 and 9 and in the direction of the arrows $P_2$ and $P_3$. When the slide elements 1 and 2 are rotated relatively to each other, the uncovered cross-section of the paired holes 8 and 9a is first reduced until they are completely closed (FIG. 4). Only after rotation through a predetermined angle has taken place is the uncovered cross section of the paired holes 8' and 9b reduced, these holes being completely closed (FIG. 5) only when the angle of rotation is greater than in the case of the first named paired holes 8 and 9a. The same applies in the case of the paired holes 8' and 9c, but the cross section begins to be reduced and the closure is complete only when the angles of rotation are still greater in each case.

Consequently, the curve shown in FIG. 6, which is to be regarded as schematic and in which the bypass quantity Q, flowing through the paired holes 8 and 9 is plotted against the angle of rotation $\alpha$, is obtained. In this graph, all the paired holes are opened in portion X of the rotary angle, only the paired holes of circle B in portion Y, and only the paired holes 8' and 9c in portion Z. The form of the curve can be determined by the length of the holes in the peripheral direction and by the number of holes of a particular size. In the case of the graph seen in FIG. 6, the holes 9c extend considerably farther in the peripheral direction than do the holes 9a. However, there are considerably fewer holes 9c than holes 9a. A typical example is an arrangement comprising 18 holes 9a, 12 holes 9b and 6 holes 9c.

In the embodiment illustrated, the axial groove 5 is connected to the bore 6 or 7 before the bypass through the paired holes 8 and 9 has been fully closed. However, this connection occurs in the portion Z or if required in the portion Y in which the quantity of fluid flowing through the bypass is greatly restricted. Consequently, dimensional differences occurring during the manufacture of the two slide elements have only a slight effect.

In the embodiment described, all the holes are illustrated as drilled round holes. They can, however, be of any other required cross section, e.g. square. The invention is also suitable in the case of control equipment comprising flat rotary slides and equipment using linear slides.

I claim:

1. A control valve assembly for hydrostatic control systems comprising relatively rotatable inner and outer bushing shaped valve elements having slidably engaging cylindrical surfaces, said inner element being displaceable in either circumferential direction from a neutral position to a working position, said elements having first and second sets of bypass holes respectively with said first set registering with said second set when said inner element is in its neutral position, said second set of holes including holes of at least three different sizes, with the smallest size hole of said second set of holes being at least as large as the largest hole of said first set, at least some of said holes of said second set being paired with smaller holes of said second set, said second set of holes being arranged relative to said first set of holes so that the relative circumferential displacement of said elements results in registering pairs of holes to sequentially moving out of registration so that fluid flow through said sets of holes is gradually diminished.

* * * * *